March 16, 1943.  L. SMITH  2,314,109

AUTOMATIC POULTRY FEEDER

Filed April 24, 1942  4 Sheets-Sheet 1

Inventor

Leon Smith

By Clarence A. O'Brien
and Harvey B. Jacobson, Attorneys

March 16, 1943. L. SMITH 2,314,109
AUTOMATIC POULTRY FEEDER
Filed April 24, 1942 4 Sheets-Sheet 2

Inventor
*Leon Smith*

By *Clarence A. O'Brien
and Harvey B. Jackson* Attorneys

March 16, 1943. L. SMITH 2,314,109
AUTOMATIC POULTRY FEEDER
Filed April 24, 1942 4 Sheets—Sheet 4

Inventor
Leon Smith
By Clarence A. O'Brien
and Harvey B. Jacobson Attorneys

Patented Mar. 16, 1943

2,314,109

UNITED STATES PATENT OFFICE 2,314,109

AUTOMATIC POULTRY FEEDER

Leon Smith, Payson, Utah

Application April 24, 1942, Serial No. 440,369

2 Claims. (Cl. 161—10)

The present invention relates to new and useful improvements in poultry feeders, and has for its primary object to provide, in a manner as hereinafter set forth, a device of this character comprising novel clock controlled means for automatically scattering the feed at any predetermined time.

Other objects of the invention are to provide an automatic poultry feeder of the aforementioned character which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 5 is a cross-sectional view through the clock chamber, taken substantially on the line 5—5 of Figure 3.

Figure 1:
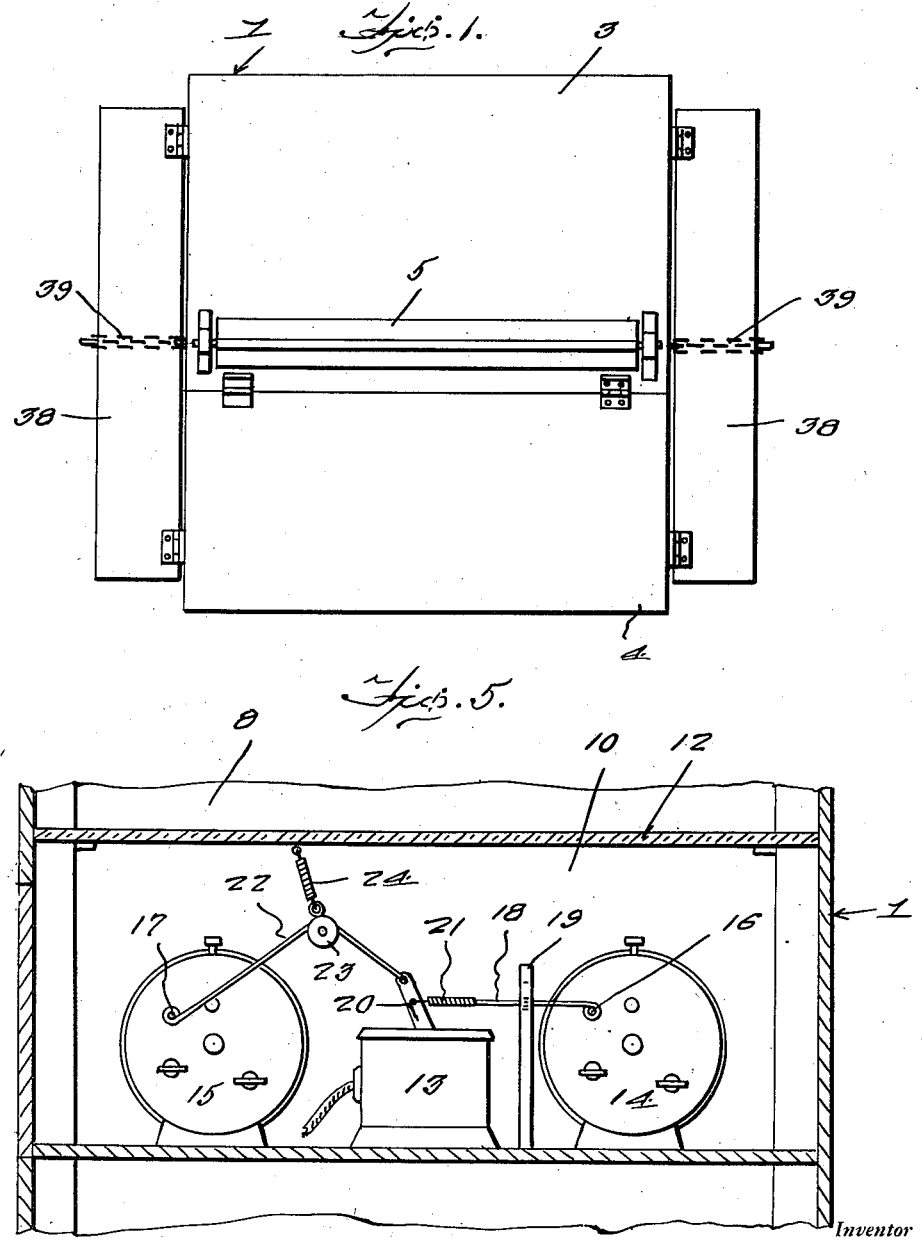
Figure 1 is a top plan view of an automatic poultry feeder constructed in accordance with the present invention.
Figure 2:
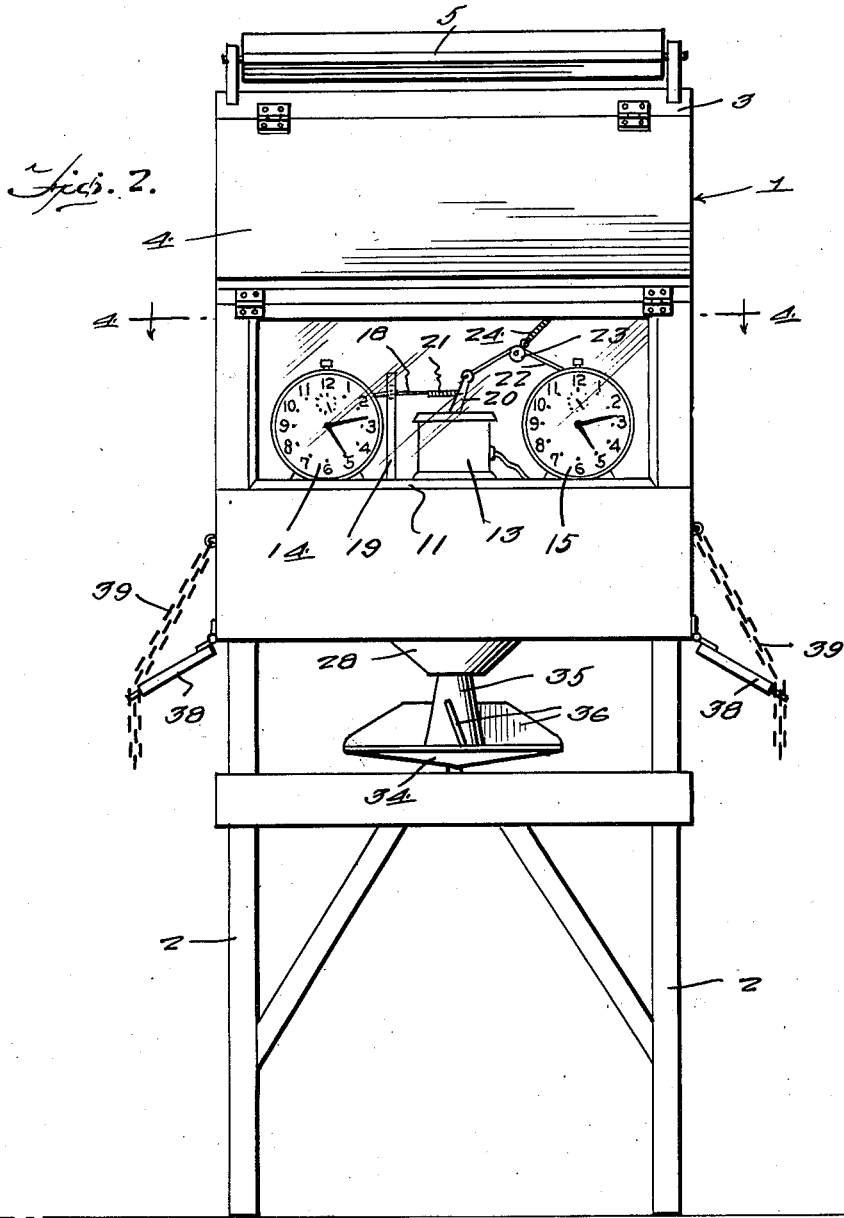
Figure 2 is a view in front elevation of the device.

Referring now to the drawings in detail, it will be seen that the embodiment of the invention which has been illustrated comprises a housing 1 of suitable material, said housing being substantially square in horizontal section. The housing 1 is supported in an elevated position on legs 2. The housing 1 includes an anticlinal top 3 which is provided with a hinged closure 4. Mounted on the peak of the top 3 is a rotary guard 5 for preventing the poultry from roosting on said top.

The housing 1 is provided with vertically spaced horizontal partitions 6 and 7 providing compartments 8 and 9. In the upper front portion of the lower compartment 9 is a chamber 10. The chamber 10 includes a hinged glass door 11, on its front, and a glass top 12.

Mounted in the chamber 10 is an electric switch 13. Also mounted in the chamber 10, on opposite sides of the switch 13, are alarm clocks 14 and 15. A cable or string 18 has one end secured to the alarm winding shaft 16 of the clock 14 thereon. The string 18 is operable through a guide post 19 which is provided therefor adjacent the clock 14 and is connected, at its other end, to the lever 20 of the switch 13 through the medium of a coil spring 21. A cable or string 22 has one end secured to the alarm shaft 17 of the clock 15 for winding thereon. The string 22 passes over a pulley 23 which is suspended from a coil spring 24 and has its other end connected to the switch lever 20 for opening the switch 13. It may be well to here state that the clock 14 closes the switch 13.

The switch 13 is electrically connected to and controls a suitable electric motor 25 which is mounted in a vertical position in the compartment 9 of the housing 1. The back of the housing 1 includes a hinged door 26 for permitting access to be had to the compartment 9.

The shaft 27 of the electric motor 25 extends vertically through the horizontal partition 6 in the housing 1. Suspended in an opening which is provided therefor in the partition 7 is a substantially conical hopper 28 for the reception of poultry feed. The bottom of the depending hopper 28 is provided with a circular discharge opening 29. Journaled in suitable bearings 30 and 31 is a vertical shaft 32 which extends centrally through the feed hopper 28. The motor shaft 27 drives the shaft 32 through a belt and pulley connection 33.

Figure 3:
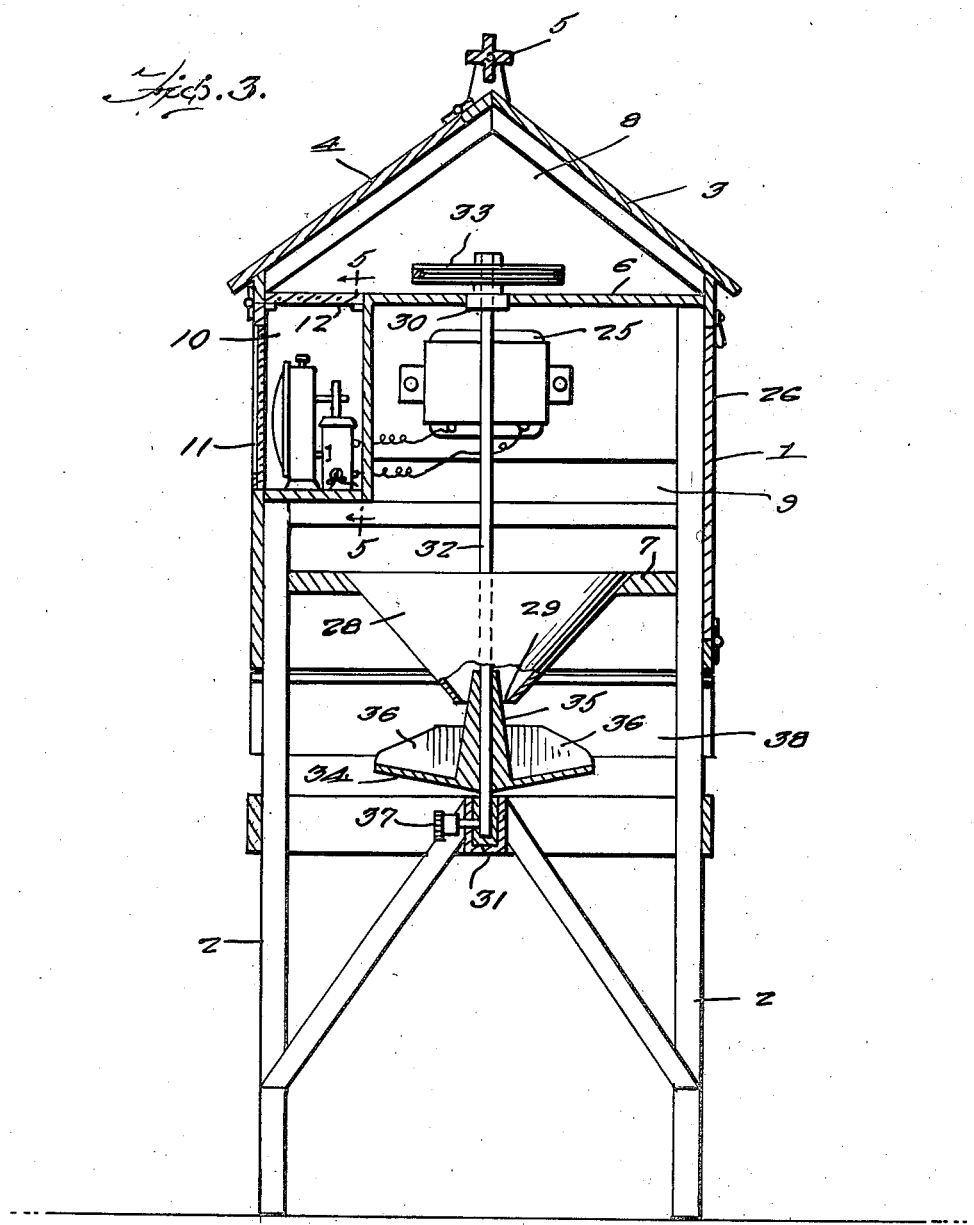
Figure 3 is a vertical sectional view through the feeder.
Figure 4:
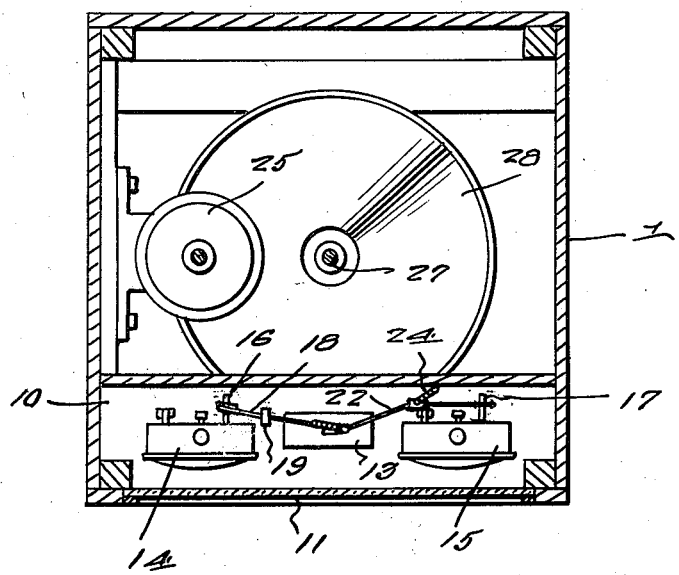
Figure 4 is a view in horizontal section, taken substantially on the line 4—4 of Figure 2.
Figure 6:
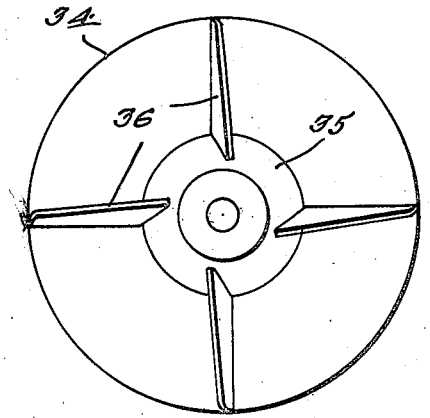
Figure 6 is a top plan view of the centrifugal scatterer.
Figure 7:
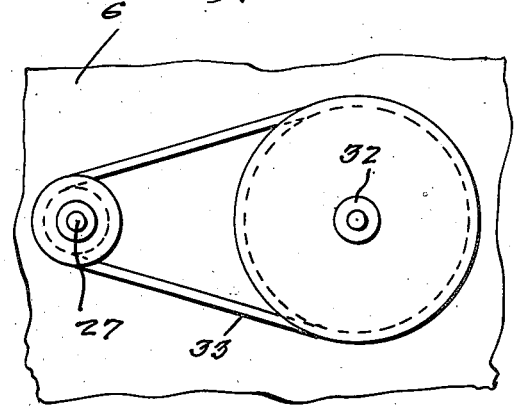
Figure 7 is a top plan view of the belt and pulley connection between the electric motor and centrifugal scatterer shafts.

Fixed on the lower portion of the shaft 32 for receiving the feed from the hopper 28 is a substantially saucer-shaped centrifugal scatterer 34 of suitable material. Rising from the scatterer 34 is a cone 35 which projects into the lower portion of the hopper 28 in a manner to leave only a narrow, annular passage for the discharge of the feed through the opening 29. This is shown to advantage in Figure 3 of the drawings. The centrifugal scatterer 34 further includes a plurality of radiating vanes or fins 36. A suitable fitting 37 is provided for lubricating the bearing 31.

Hingedly suspended for swinging adjustment in a vertical plane on the sides of the housing 1, adjacent the scatterer 34, is a pair of baffles 38 for controlling or regulating the distance that the feed may be thrown laterally from the device. Supporting chains 39 are adjustably connected to the baffles 38 for securing said baffles in any desired position.

It is believed that the operation of the device will be readily apparent from a consideration of the foregoing. Briefly, the door 1 is opened for permitting the desired quantity of poultry feed to be placed in the hopper 28. With the cone 35 stationary, the passage 29 is so narrow that the feed in the hopper 28 readily clogs therein. The alarms of the clocks 14 and 15 are then set to go off at different times. For example, the alarm of the clock 14 may be set to go off at 5:00 o'clock and the alarm for the clock 15 may be set to go off at 5:15 o'clock. When the alarm of the clock 14 goes off, the string 18 is wound on the shaft 16 and the lever 20 is thrown in a direction to close the switch 13, thus energizing and starting the electric motor 25. In this manner the shaft 32 with the centrifugal scatterer 34 thereon are rotated at the desired speed. With the cone 35 rotating, the feed flows by gravity from the hopper 28 through the opening 29 onto the scatterer 34 from which it is thrown in all directions by centrifugal force. When the alarm of the clock 15 goes off, the switch lever 20 is thrown in the opposite direction by the string 22 which is wound on the shaft 17, thus opening the switch 13 again for de-energizing the electric motor 25. The coil springs 21 and 24 facilitate operation of the switch lever 20 in opposite directions by the clocks 14 and 15, in addition to preventing slack in the strings 18 and 22. The baffles 38 are adapted to deflect downwardly the feed that is thrown toward the opposite sides of the device by the scatterer 34.

It is believed that the many advantages of an automatic poultry feeder constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A poultry feeder of the character described comprising an elevated housing, a substantially conical hopper for the reception of feed, mounted in the housing and having a discharge opening in its lower portion, a centrifugal scatterer rotatably mounted below the hopper for receiving the feed therefrom, means for actuating the scatterer, hingedly mounted baffles suspended from the lower portion of the housing for swinging adjustment in a vertical plane for deflecting the feed from the scatterer downwardly, and chains adjustably connected to said baffles for supporting same in adjusted position.

2. A poultry feeder of the character described comprising a housing, a hopper, for the reception of feed, mounted in said housing, a centrifugal scatterer for receiving the feed from the hopper, an electric motor operatively connected to the scatterer, an electric switch for controlling the motor, alarm clocks mounted in the housing on opposite sides of the switch, a string secured at one end to the alarm shaft of one of the clocks for winding thereon, a coil spring connecting the other end of said string to the switch for closing said switch, a coil spring suspended in the housing, a pulley suspended from the second-named coil spring, and a string having one end secured to the alarm shaft of the other clock for winding thereon, the second-named string being trained over the pulley and having its other end connected to the switch for opening said switch.

LEON SMITH.